(12) United States Patent
Lyon

(10) Patent No.: US 6,834,327 B2
(45) Date of Patent: Dec. 21, 2004

(54) MULTILEVEL CACHE SYSTEM HAVING UNIFIED CACHE TAG MEMORY

(75) Inventor: Terry Lyon, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 37 days.

(21) Appl. No.: 10/071,069

(22) Filed: Feb. 8, 2002

(65) Prior Publication Data

US 2003/0154345 A1 Aug. 14, 2003

(51) Int. Cl.⁷ .................................................. G06F 12/00
(52) U.S. Cl. ...................... 711/122; 711/141; 711/144; 711/119; 711/117
(58) Field of Search ................................ 711/122, 141, 711/144, 119, 117

(56) References Cited

U.S. PATENT DOCUMENTS

| | | | | |
|---|---|---|---|---|
| 4,823,259 | A | * | 4/1989 | Aichelmann ................. 364/200 |
| 5,649,154 | A | | 7/1997 | Kumar et al. |
| 5,802,578 | A | * | 9/1998 | Lovett ......................... 711/147 |
| 5,860,078 | A | | 1/1999 | Emmot |
| 6,115,792 | A | * | 9/2000 | Tran ........................... 711/128 |
| 6,247,094 | B1 | * | 6/2001 | Kumar ............................ 711/3 |
| 6,427,188 | B1 | * | 7/2002 | Lyon ........................... 711/122 |
| 6,591,341 | B1 | | 7/2003 | Sharma |
| 2002/0099913 | A1 | * | 7/2002 | Steely ......................... 711/122 |
| 2002/0108021 | A1 | * | 8/2002 | Syed ........................... 711/128 |
| 2002/0152359 | A1 | * | 10/2002 | Chaudhry ..................... 711/141 |

OTHER PUBLICATIONS

Lee, et al, "Shared tag for MMU and cache memory," pp 77–80, CAS '97 Proceedings, vol. 1, IEEE, Oct. 1997.
Lee, et al., "Indirectly–compared cache tag memory using a shared tag in a TLB," pp 1764–1766, Electronics Letters, vol. 3, No. 21, Oct. 1997.

* cited by examiner

Primary Examiner—Kimberly McLean-Mayo

(57) ABSTRACT

A unified tag subsystem for a multilevel cache memory system. The unified tag subsystem receives a cache line address including a tag index portion, a high order part and an optional cache line extension field. The tag index portion indexes a tag memory which has way-specific address tags, and lower level flags. A comparator compares the high order part with each way-specific address tag to detect a match. Lower level hit logic determines a hit when comparator detects a match and the lower level flag indicates a valid lower level cache entry; and an upper level hit logic determines a higher level cache hit when the comparator detects a match and the upper level valid is set. In particular embodiments, lower level flag indicates a way of storage where associated data may be found in lower level cache data memory.

13 Claims, 3 Drawing Sheets

MULTILEVEL CACHE SYSTEM HAVING UNIFIED CACHE TAG MEMORY

FIELD OF THE INVENTION

The invention relates to multilevel cache memory systems, such as may be used in modern computer systems. In particular, the invention relates to a unified cache tag system capable of storing cache tags for multiple levels of cache. The unified cache tag system is capable of supporting multiple levels of cache with nonuniform cache line sizes and associativities.

BACKGROUND OF THE INVENTION

Cache memories are high speed memory systems that store a partial copy of the contents of a larger, slower, memory system. In addition to storage, cache memory systems also have apparatus for identifying those portions of the larger, slower, memory system held in cache, this often takes the form of a cache tag memory.

Many modern computer systems implement a hierarchy of cache memory systems. Many common processors, including Intel Pentium-II and Pentium-III circuits, have two levels of cache. There exist computing systems with three levels of cache.

Cache memories typically have separate cache tag memories for each level of cache. In a three level cache memory, there are typically separate tag memories for each level of the cache.

Since off-chip references are significantly slower than on-chip references, yet off-chip cache can be much faster than main memory, three level cache systems may have the first and second levels of cache on-chip, with the third level off-chip. Alternatively, a three level cache system may have the first and second levels of cache on chip, together with the tag subsystem of the third level, while third level cache data is off-chip.

These cache systems have cache tag memory subsystems and cache data memory subsystems. Each cache data memory typically operates on units of data of a predetermined size, known as a cache line. The size of a cache line can be different for each level in a multilevel cache system; when cache line sizes differ, they are typically larger for higher levels of cache. Typically, the size of the cache data memory is also larger for higher levels of cache.

In typical cache memory systems, when a memory location at a particular main-memory address is to be read, a cache-line address is derived from part of the main-memory address. A portion of the cache-line address is typically presented to the cache tag memory and to the cache data memory; and a read operation done on both memories.

Cache tag memory typically contains one or more address tag fields. Multiple address tag fields can be, and often are, provided to support multiple "ways" of associativity in the cache. Each address tag field is compared to the remaining hits of the cache-line address to determine whether any part of data read from the cache data memory corresponds to data at the desired main-memory address. If the tag indicates that the desired data is in the cache data memory, that data is presented to the processor and next lower-level cache; if not, then the read operation is passed up to the next higher-level cache. If there is no higher-level cache, the read operation is passed to main memory. N-way, set-associative, caches perform N such comparisons of address tag fields to portions of desired data address simultaneously.

Cache memories having cache data memories not located on a processor chip are known as "off-chip" caches. Cache memories located on a processor chip are known as "on-chip" caches. Some "off-chip" caches have on-chip tag memories, although the data memory is off-chip.

Typically, a tag memory contains status information as well as data information. This status information may include "dirty" flags that indicate whether information in the cache has been written to but not yet updated in higher-level memory, and "valid" flags indicating that information in the cache is valid.

A cache "hit" occurs whenever a memory access to the cache occurs and the cache system finds, through inspecting its tag memory, that the requested data is present and valid in the cache. A cache "miss" occurs whenever a memory access to the cache occurs and the cache system finds, through inspecting its tag memory, that the requested data is not present and valid in the cache.

When a cache "miss" occurs in a low level cache of a typical multilevel cache system, the main-memory address is passed up to the next level of cache, where it is checked in the higher-level cache tag memory in order to determine if there is a "hit" or a "miss" at that higher level. In a three-level cache system of this type, an address must be tried against three successive cache tag memories before an overall cache miss can be declared, and a main memory reference started.

Typically, the number of "ways" of associativity in a set-associative cache tag subsystem is the number of sets of address tags at each index, or line, of tag memory, and corresponding sets of comparators. The number of ways of storage is the number of cache lines that can be stored and independently referenced through a single line of cache tag memory. In most caches, the number of ways of associativity is the same as the number of ways of storage. Cache superlines are combinations of multiple cache lines that can be referenced though a single address tag in a line of tag memory.

Writethrough caches are those in which a write operation to data stored in the cache results in an immediate update of data in a higher level of cache or in main memory. Writeback caches are those in which a write operation to data stored in the cache writes data in the cache, but update of data in higher levels of cache or in main memory is delayed. Operation of cache in writeback and writethrough modes is known in the art.

It is desirable to quickly determine a cache "miss", so as to more quickly start main memory references for data not found in cache. It is desirable to minimize the physical area on a CPU chip required as overhead for multiple, separate, tag memories. It is also desirable to have flexibility to adjust cache sizes, or ways of associativity, in later stages of processor development to adjust for power or growth of other units on the circuit. It is also desirable to have a simple way to adjust cache sizes to provide lower cost product offerings.

Whenever a cache "miss" occurs at any level of the cache, data fetched from a higher level of cache or main memory is typically stored in the cache's data memory and the tag memory is updated to reflect that data is now present. Typically also, other data may have to be evicted to make room for the newly fetched data. Cache line eviction and replacement is well known in the art.

Many computer systems embody multiple processors, each having its own cache system. Typically, processors of such systems may access shared memory. Coherency is required in cache memory of such computer systems. Cache coherency means that each cache in the system "sees" the same memory values. Therefore, if a cache wants to change the value of memory, all other caches in the system having copies of that memory location in its cache must either update its value or invalidate its contents.

There are several solutions to cache coherency in multiple processor cache-equipped systems that are commonly used with conventional cache systems. Typically this is done by providing cache coherency maintenance logic.

Cache coherency maintenance logic may take the form of "snoop" logic for snooping accesses to the shared memory. Snooping can involve having each processor cache of the system monitor a bus for memory accesses, including writes, by other processors and caches of the system. This monitoring is typically performed by performing a cache tag lookup, through a snoop port on the cache tag memory subsystem, whenever an address from another processor or cache is present on the bus. When a cache tag memory subsystem sees snoop references to an address corresponding to data held in the cache, that cache invalidates or updates its copy of the data as appropriate to maintain coherency.

Other forms of cache coherency maintenance logic are known, including directory based coherency maintenance systems where a system controller keeps track of cache line ownership.

SUMMARY OF THE INVENTION

A computer system has more than one level of cache, in a particular embodiment there are three levels of cache. Two of those levels of cache are implemented in a hybrid cache system.

The hybrid cache system has a unified cache tag subsystem, common to both of its cache levels. Data memories of its cache levels may, but need not, reside on the same integrated circuit. Access times for its cache levels are typically different, with higher levels of cache being slower. The unified cache tag subsystem has at least one way of associativity. Each way of associativity has associated address, level, and flag fields. The address field is used to determine whether a "hit" occurs, and the level field indicates a lower level cache "hit" and in which "way" of storage the hit is located.

In a particular embodiment, the unified cache tag subsystem is snoopable to ensure coherency with other caches of a system.

In another embodiment, there are two levels of cache. Both of these levels of cache are implemented in a hybrid cache system having a unified cache tag subsystem.

In yet another embodiment, the higher level cache addressed by the unified cache tag subsystem has superlines, and cache line that are greater in width in the higher level cache than the cache line size of the lower level cache. This embodiment has a higher level cache of much greater size than the lower level cache.

In another embodiment, a way limit register is provided to adjust the associativity of a cache in the unified cache tag. This flexibility can be used to decommission defective ways of a cache or of a cache tag. It can also be used to simply provide control of a reduced cache size to enable a lower cost product.

DETAILED DESCRIPTION OF THE EMBODIMENTS

Figure 1:
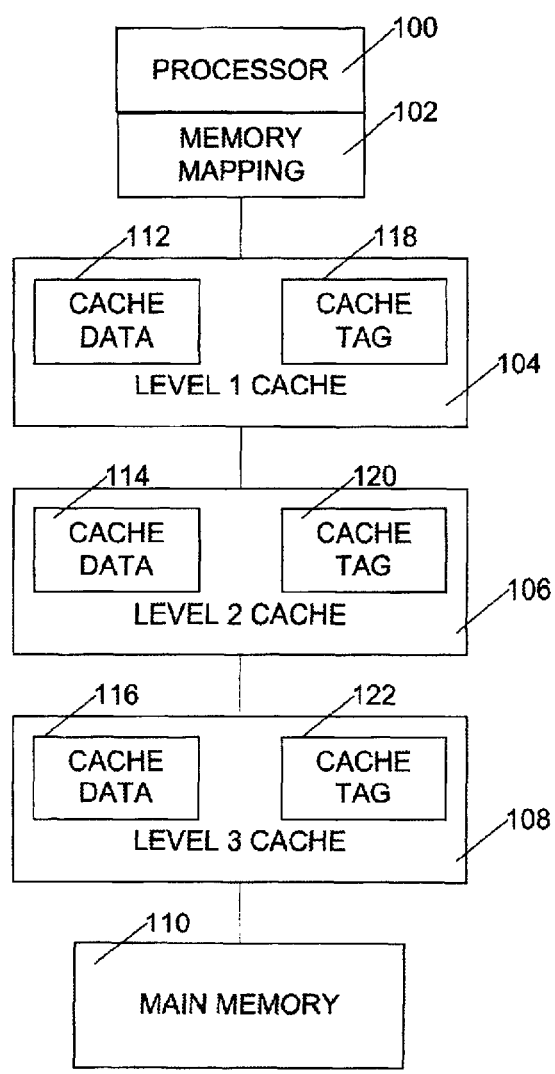
FIG. 1 is a block diagram of a computer system as known in the art, having three levels of cache.

A computer system having a multilevel cache memory as known in the art (FIG. 1) has a processor 100 and memory mapping hardware 102, which may include a Translation Lookaside Buffer (TLB). Memory references from processor 100 are directed through memory mapping hardware 102 to a first level cache 104. Memory references involving a cache "miss" in first level cache 104 are directed to a second level cache 106, and those that "miss" at the second level cache are directed to a third level cache 108. Any references that "miss" in all three levels of cache are directed to a main memory 110. Each level of cache has a data memory 112, 114, 116, and a tag memory 118, 120, 122; for example data memory 112 and tag memory 118 are components of first level cache 104, data memory 114 and tag memory 120 are components of second level cache 106, and data memory 116 and tag memory 122 are components of third level cache 108.

Figure 2:
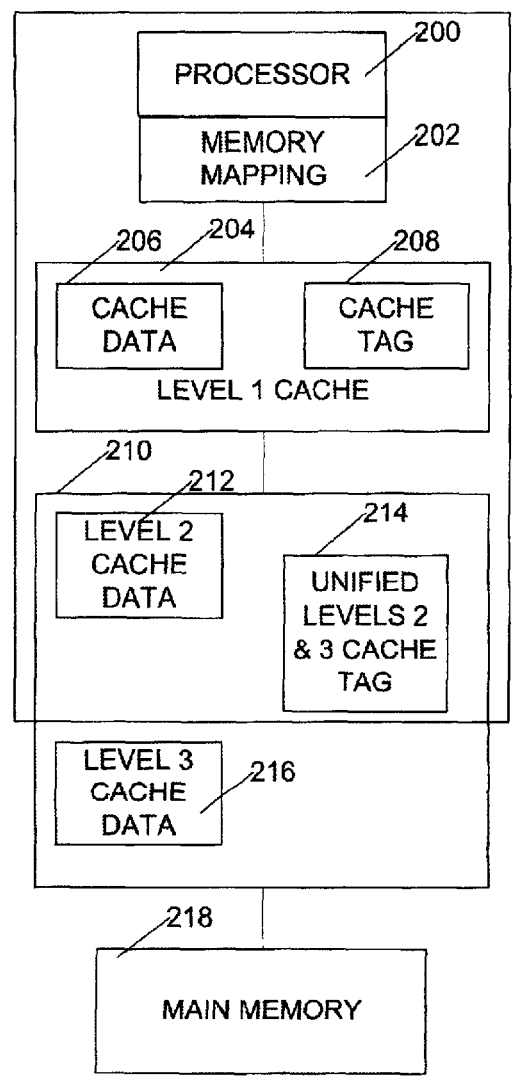
FIG. 2, a block diagram of a computer system embodying a three level cache, where the second and third levels of cache have a common tag memory.

A computer system having a multilevel cache memory embodying the invention has a processor 200 (FIG. 2) and memory mapping hardware 202, as known in the art. Memory references from processor 200 are directed through memory mapping hardware 202 to a first level cache 204. First level cache 204 is conventional, having data memory 206 and tag memory 208 among its components.

Memory references that "miss" in first level cache 204 are directed to a hybrid second-and-third level cache subsystem 210, where they enter through a processor port. Hybrid cache subsystem 210 incorporates a second-level cache data memory 212 and a unified cache tag memory 214 on the same integrated circuit as processor 200 and first level cache 204. Each memory reference that "misses" in first level cache 204 causes a lookup in unified cache tag memory subsystem 214. References that "hit" in unified cache tag memory subsystem 214 are determined to be a hit in second level cache and/or a hit in third level cache, according to information stored in unified cache tag memory 214. References that hit second level cache are given data from second level data cache 212, and those that hit in third level cache are given data from off-chip third level data cache 216.

The cache tag memory 214 is unified in that each location in unified cache tag memory 214 contains information for locating data in both second level data cache 212 and third level data cache 216. Further, each read of cache tag memory 214 simultaneously reads information for locating data in second level data cache 212 and third level data cache 216.

References that do not hit in either the first level cache tag memory 208 or in the unified second and third level tag memory 214 are passed on to higher levels of memory, such as main memory 218.

Physical memory addresses 302 (FIG. 3) entering the processor port 300 of the hybrid cache subsystem 210 are broken into several fields. Among these fields are a high order partial address 304, a tag index 306, a cache line partial address 308, and an optional "s" cache line partial address field 310. The cache line partial address 308 represents addressing within a cache line. If the level 3 cache has a larger cache line size than the lower level (level 2) cache line size, the "s" partial address 310 provides the extra cache line address hits for the upper level (level 3) cache, and the cache line partial address 308 represents addressing within the lower (level 2) of cache and part of the higher level (level 3) cache line address.

The tag index 306 is used to address tag memory system 312 to read a tag. Each tag has several way-specific address tags 316 and 318. Two ways are illustrated for simplicity; the invention is applicable to larger numbers of "ways." It is anticipated that the cache may be implemented with one, two, three, four, five, six, or even more "ways." Each way-specific address tag 316, 318 is associated with a way of associativity.

Each way-specific address tag 316 and 318 is routed to a comparator 320 and 322, where it is compared against the high order partial address 304.

In an embodiment having a larger level-3 cache line size than level-2 cache line size, each way-specific address tag 316 and 318 is also associated with way-specific subline way tags (or "L0" and "L1") field 324, 332, 334 and 326. Way specific subline way tags 324, 332, 334, 326 indicate a way of storage in which associated data may be located. The "S" field 310 is used to select, through multiplexors 328 and 330, which subline way tag field 324, 332, 334 and 326 is used to determine if the smaller cache line is valid in the lower level, and if valid in which way it resides in the lower cache. This determination is performed by decoder 329 and 331.

Compare results of comparators 320 and 322, are combined in logic gates 342 and 344 with decode results from 329 and 331 to determine cache hits for the lower level cache (level 2) for each way of associativity. Each hit from each way of associativity is combined together in lower level hit logic 336 to determine the level 2 cache hit signal 347.

In embodiments having wider "S" subline partial address fields 310, it is anticipated that there may be additional subline way tag fields, or "L" tags. In other embodiments having wider "S" subline partial address fields multiplexors 328 and 330 will need to select between additional way-specific subline way tag fields. A two-hit "s" subline partial address field will require the selection of one out of four lower level way tag fields. In these embodiments, the lower level way tag field indicates whether data is valid in the lower level cache and in which way it had been allocated. Alternatively, comparators (not shown) may compare a subline field to the subline partial address field and use a level flag of one or more ways of the tag memory subsystem to determine whether a lower level hit occurs.

If a lower level cache "hit" is found, this takes precedence over any upper level cache "hits."

Figure 3:
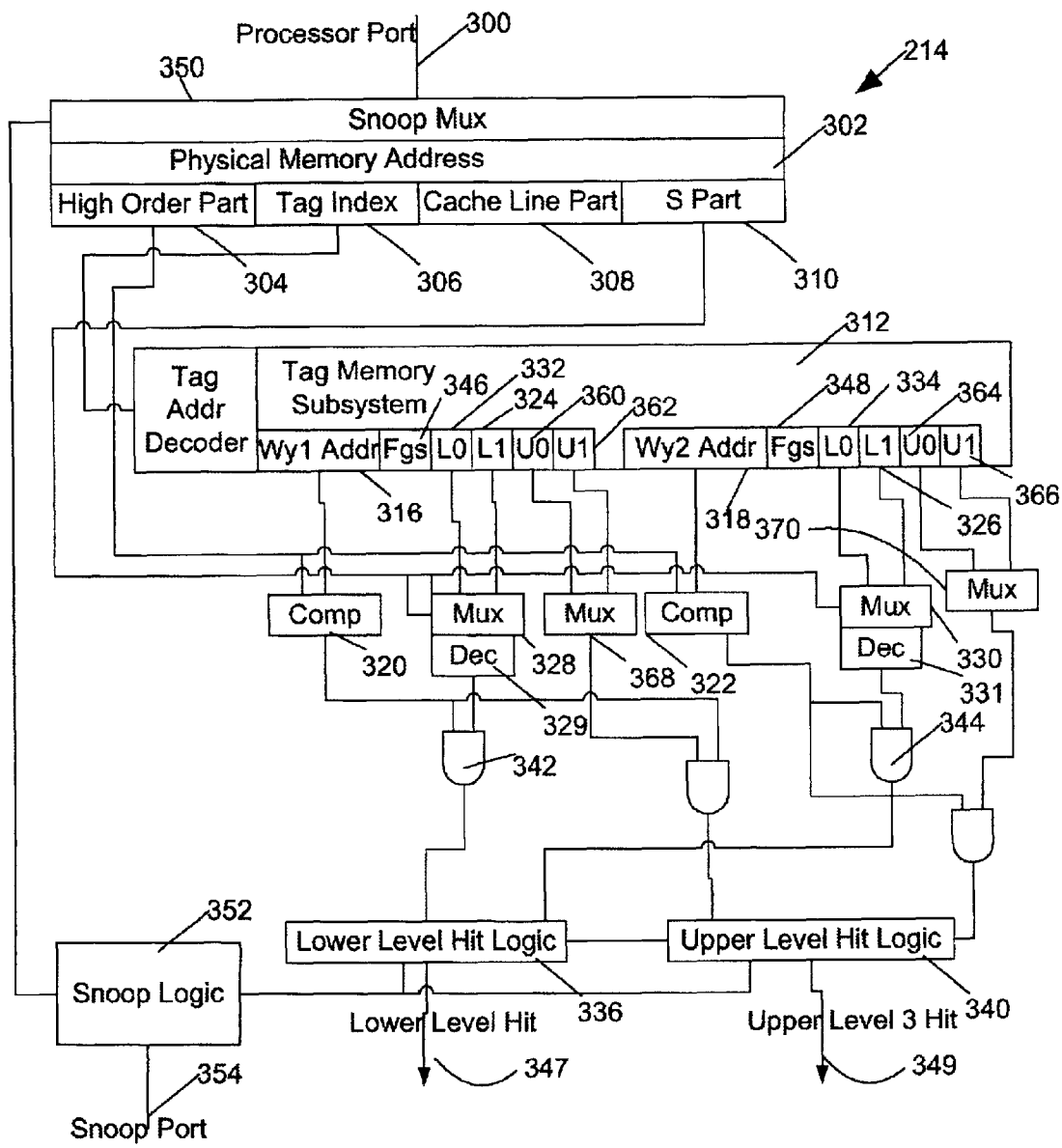
FIG. 3, a block diagram illustrating portions of a snoopable, unified tag memory, capable of controlling two levels of cache, utilizing a "super cache line" in the upper level cache.

In the embodiment of FIG. 3 a "super" or "sectored" cache line size is assumed for the upper level cache. With a "super" cache line a single cache tag is shared between 2 or more physical cache lines. This implementation requires fewer cache tags while still providing equivalent associativity. In the embodiment of FIG. 3 a double sized "super" cache line is assumed for the upper level cache, which contains two physical cache lines.

Since "super" cache lines may be brought into the cache as individual physical cache lines, there are unique valid hits for each line. These are the "U" flags 360, 362, 364, and 366.

U flags 360, 362, 364, and 366 incorporate valid information together with line information. To select the proper valid hit for a specific cache address 302, muliplexers 368 and 370 select between "U" flags 360, 362, 364, and 366 based upon the value of the "S" cache line partial address 310.

In an alternative embodiment where each, "super" cache line is made up of four physical cache lines (not shown), multiplexers 368, 370 select between four "U" flags under control of a 2-hit "S" cache line partial address 310.

Comparator results of comparators 320 and 322, and selected "U" flag valid hits from multiplexors 368 and 370, are ANDed in logic gates 342 and 344 which then feed into theu upper level hit logic 340 to detect "hits" in the higher level (level 3) of cache.

In a particular embodiment, flags 346 and 348 include a "Modified" flag, indicating that the associated cache line has been written to by the processor, an "Exclusive" flag, indicating that the cache line is private to this processor and can be written without contacting other processors, and a "Shared" flag indicating that the line can be read but may be held in other processor caches. In this embodiment, there is one set of "modified", "shared" and "exclusive" flags used for both levels of cache. Data transfer operations much occur to update the higher level of cache when the lower level cache has been modified, the lower level is a "write-through" cache with respect to the upper level of cache, the upper level of cache is setable to either write-through or a writeback mode with respect to main memory. These flags 346 and 348 may also include recency of use information and other information of use in cache management as known in the art.

The present invention also comprehends another embodiment in which the lower level cache has a separate "modified" flag associated with each subline way tag field. In such an embodiment, it is possible to delay writing from the lower level to the upper level cache, operating in "writeback" manner.

Lower level "hit" signal 347 and upper level "hit" signal 349 are then used to control processor accesses to cache data memories 212 and 216 (FIG. 2) as known in the art. The cache tag memory is maintained preferably utilizing a least-recently-used algorithm for determining cache evictions. The present unified cache tag subsystem typically can determine whether there is a lower level cache hit, or an upper level cache hit, simultaneously.

In a multiprocessor system, or other system where main memory 218 may be accessed by another source, cache snooping is used to ensure cache coherency in the system. When a memory reference to main memory 218 is seen from an additional processor or other external source, information regarding that external reference, including its cache line address, is brought through a snoop port 354 into snoop logic 352. Snoop multiplexer 350 then selects the snoop address instead of the processor port address 300, feeding the selected address to 302. An address comparison is performed on the unified tag as heretofore described, and "hit" logic information is used to determine whether a cache line must be invalidated. Invalidation is performed by clearing the appropriate upper level cache "U" flags 360, 362, 364 and 366 and the appropriate lower level cache "L" flags encoded in the lower level way fields 332, 324, 334,326.

In an alternative embodiment that lacks a "super" cache line there is a physical line size in the upper level cache that is larger than the line size of the lower level cache. In such an embodiment, the multiple upper level "U" flags (U0 and U1) are combined into one "U" hit and multiplexors 368 and 370 are unneeded.

Another alternative embodiment has the same cache line size for both upper and lower level caches. In this implementation, the two lower level way "L" flags 324, 332 become one "L" flag, and the upper level "U" flags 360, 362 are combined in a single "U" flag. In this embodiment, multiplexors 328, 330, 368 and 370 are unneeded and the "S" cache line partial address extension 310 is not needed.

The number of ways of storage of the lower level cache (level 2) and the higher level cache (level 3) can be different, but the lower level cache line size times its number of ways is expected to be less than the higher level cache line size times its associativity. This assures that all data within the lower level cache can also reside in the upper level cache.

The associativity of the upper level cache is specifically defined by the number of way address groupings 316 and 318 and comparators. The number of ways of storage and specific way valid information for the lower level cache is coded into the "L" fields 332, 324, 334, 326 of the unified cache tag. This permits the lower level cache to have a different number of ways of storage than the higher level cache.

In a particular embodiment having 6 ways of storage for the lower level cache, the coding of the "L" fields is a three-hit code wherein a value of 0 means the data is not present in the lower level cache, 1 means that data is valid in the lower level cache in way 1, value 2 means that the data is valid in the lower level of cache in way 2, and so on.

The way of storage is selected in parallel with the selection of the valid flag, with multiplexors 328 and 330 and decode blocks 329 and 331. The multiplexors select the proper "L" field based on the "S" value, and the decoder translates the field into a "valid" and a "way". The generated way value for the lower level cache is provided to the data cache to either be used to select the proper data (if the ways of data are read out in parallel then selected) or to be used as part of the address field to read the cache (if the ways are built into the memory addressing).

This unified cache tag structure allows flexibility in degrading out specific ways of either the upper or lower level cache. A "way" of storage in the lower level cache can be degraded by providing hardware that will not allocate to a specific way (such as way 3) and this is accomplished by preventing assignment of that way's code (011) in the "L" fields of unified cache tag 312. Likewise a "way" of associativity in the upper level cache can be degraded by disabling all appropriate "U" flags for a particular way, such as "U" flags 360 and 362, in the unified cache tag 312. By providing logic to disable allocation in a specific way, the "valid" flags for that way in the upper level cache tag are never set and the associated way of storage is disabled. The cache tag for the unallocated upper level way is still usable for the lower level cache tag. The address tag, any coherency tag, and the "L" fields can still be assigned and used for the lower level cache.

In an alternative embodiment, therefore, there is a cache configuration register having two fields, a lower level way enablement flag field and an upper level way enablement flag field. This cache configuration register is set at boot time, prior to enablement of the cache, or through software-controlled hardware degrade techniques, with a mask pattern having a "1" for each way that is permitted to operate, and a "0" for each way that is disabled.

Figure 4:
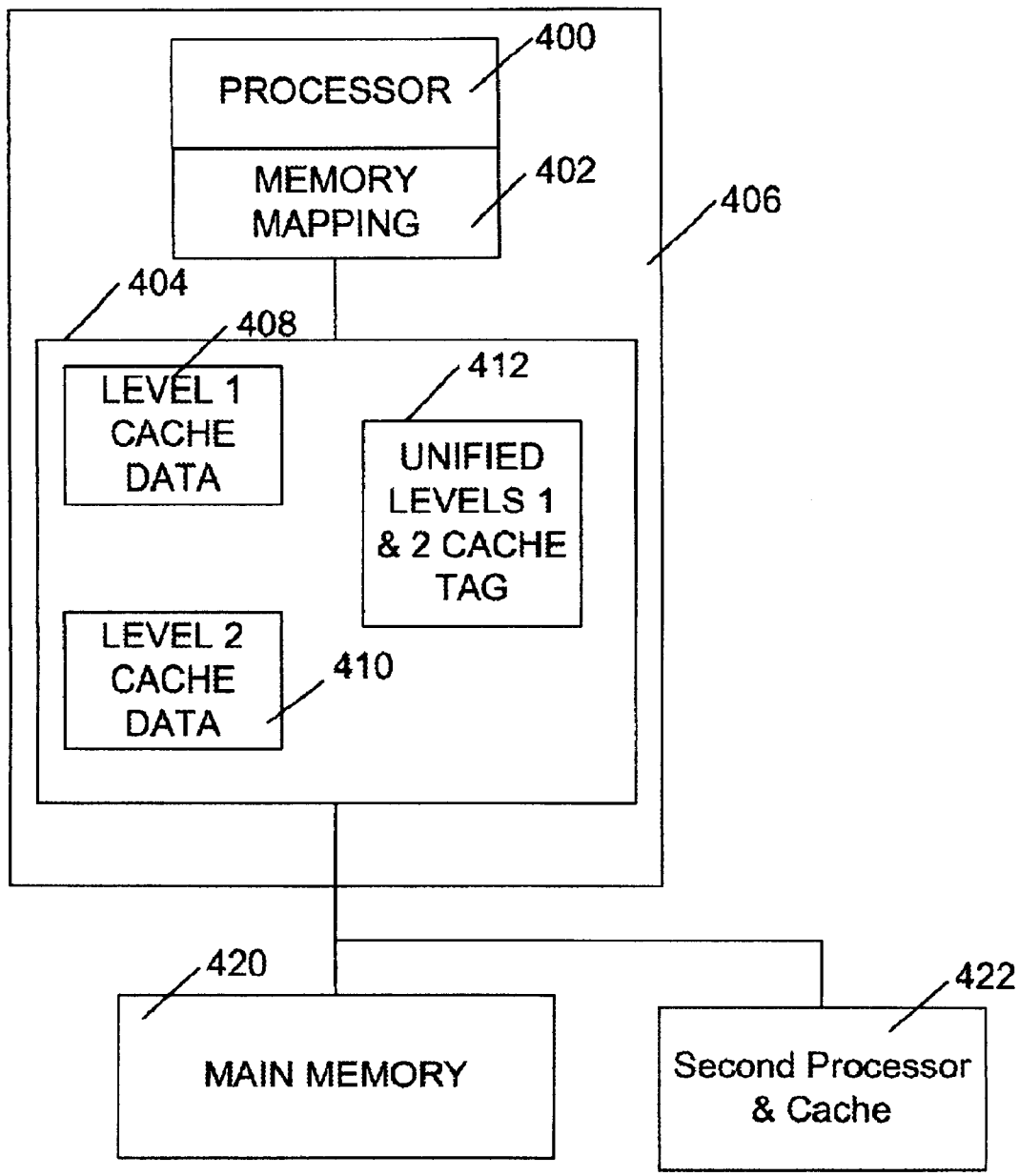
FIG. 4, a block diagram illustrating a machine having two levels of cache having a unified tag memory, where both levels of cache are on the same integrated circuit.

In an alternative embodiment, a processor 400 (FIG. 4) has an address mapping unit 402 that generates physical memory addresses for memory references. These memory references are passed to a hybrid cache subsystem 404 located on the same integrated circuit 406 as processor 400.

Hybrid cache subsystem 404 has a first level cache data memory 408, a second level cache data memory 410, and a unified cache tag subsystem 412. Unified cache tag subsystem 412 determines first level hits and second level hits as heretofore described with reference to FIG. 3, except that the lower level is level one and the upper level is level two of hybrid cache subsystem 404. References that hit in neither level of the hybrid cache system are passed to higher level memory, such as main memory 420. The system may, but need not, incorporate a second processor 422 having a separate cache system.

While the unified cache tag subsystem has been described with reference to level flags and other flags such as valid flags, it is anticipated that the invention is operable with coded fields capable of representing when data is present in the lower level of cache. The term "level flag" therefore includes any coding of hits in a field of tag memory that is capable of indicating which level or levels of cache contains valid data.

It is also anticipated that the present invention is operable with more than two levels of cache accessed through the unified cache tag subsystem. In particular, it is anticipated that a unified cache tag memory subsystem could incorporate a set of level way flags for a third level of cache, and a third hit logic. A cache tag memory subsystem of this type would be capable of controlling three levels of cache.

While the invention has been particularly shown and described with reference to particular embodiments thereof, it will be understood by those skilled in the art that various other changes in the form and details may be made without departing from the spirit and scope of the invention. It is to be understood that various changes may be made in adapting the invention to different embodiments without departing from the broader inventive concepts disclosed herein and comprehended by the claims that follow.

What is claimed is:

1. A unified tag subsystem for a multilevel cache memory system having an upper level and a lower level of cache data memory, the tag subsystem having at least a processor port for receiving a cache line address comprising a tag index portion, and a high order part, the unified tag subsystem comprising:
   a unified tag memory coupled to be addressed by the tag index portion of the cache line address, the tag memory comprising at least one way-specific address tag, at least one upper level valid flag, and at least one way-specific lower level flag;
   at least one first comparator coupled to compare the high order part with the at least one way-specific address tag and detect a match;
   a lower level hit logic coupled to determine a lower level cache hit when the at least one first comparator detects a match, and the lower level flag of the tag memory indicates a valid entry in the lower cache; and
   an upper level hit logic coupled to determine a higher level cache hit when the at least one first comparator detects a match, and a high level valid flag of the tag memory is in a valid state.

2. The unified cache tag subsystem of claim 1, wherein there are at least two way-specific address tags, and at least two first comparators.

3. The unified cache tag subsystem of claim 2 wherein the unified cache tag subsystem further comprises cache coherency maintenance logic coupled to the tag memory subsystem.

4. The unified cache tag subsystem of claim 3, wherein the coherency maintenance logic is cache snoop logic.

5. The unified cache tag subsystem of claim 1 wherein the at least one way-specific lower level flag comprises information indicating a way of storage in lower level data memory at which cache data may be located.

6. The unified cache tag subsystem of claim 5, wherein there are a plurality of first comparators for multiple ways of associativity.

7. A multilevel cache memory system having at least a processor port for receiving a cache line address comprising a tag index portion, and a high order part; the multilevel cache memory system comprising:

a lower level cache data memory coupled to provide data to the processor port on a lower level cache hit;

an upper level cache data memory coupled to provide data to the processor port on an upper level cache hit;

a unified tag subsystem further comprising:

a tag memory coupled to be addressed by the tag index portion of the cache line address, the tag memory comprising at least one way-specific address tag field, at least one way-specific lower level flag field, and at least one way-specific upper level valid flag;

at least one comparator coupled to compare the high order part with the at least one way-specific address tag and detect a match;

a lower level hit logic coupled to determine a lower level cache hit when the at least one first comparator detects a match and the lower level flag indicates valid cache data in the lower level cache data memory; and an upper level hit logic coupled to determine a higher level cache hit when the at least one first comparator detects a match, and the a higher level valid flag field indicates valid cache data in a upper level cache data memory.

8. The cache system of claim 7, wherein the higher level valid flag field comprises a plurality of higher level valid flags, and wherein each higher level valid flag indicates validity of data in a line of a superline in upper level cache data memory.

9. The multilevel cache memory system of claim 7 wherein a cache line of the lower level cache data memory is smaller than a cache line of the upper level cache data memory, wherein lower level cache data memory has fewer ways of storage than the upper level cache data memory, wherein the lower level flag field of the unified cache tag subsystem further comprises a plurality of lower level flags, wherein the lower level flags indicate ways of storage in lower level cache data memory where corresponding data is located in lower level cache data memory.

10. The multilevel cache memory system of claim 7, wherein the multilevel cache memory system further comprises cache coherency maintenance logic.

11. The multilevel cache memory system of claim 7, wherein the upper level valid flags of the cache tag memory subsystem further comprise a plurality of way-specific superline segment valid flags, and wherein each superline segment valid flag contains validity information for an upper level cache line of an upper level cache superline, and wherein the upper level cache data memory is capable of storing a plurality of superlines.

12. The multilevel cache memory system of claim 7, wherein the unified tag subsystem further comprises way limit apparatus whereby specific ways of storage may be disabled.

13. A multilevel cache memory system having at least a processor port for receiving a cache line address comprising a tag index portion, and a high order part; the multilevel cache memory system comprising:

a lower level cache data memory coupled to provide data to the processor port on a lower level cache hit;

an upper level cache data memory coupled to provide data to the processor port on an upper level cache hit;

a unified tag subsystem further comprising:

a tag memory coupled to be addressed by the tag index portion of the cache line address, the tag memory comprising at least one way-specific address tag field, at least one way-specific lower level flag field, and at least one way-specific upper level valid flag;

at least one comparator coupled to compare the high order part with the at least one way-specific address tag and detect a match;

a lower level hit logic coupled to determine a lower level cache hit when the at least one first comparator detects a match and the lower level flag indicates valid cache data in the lower level cache data memory;

an upper level hit logic coupled to determine a higher level cache hit when the at least one first comparator detects a match, and the a higher level valid flag field indicates valid cache data in a upper level cache data memory; and wherein the upper level data cache is larger and slower than the lower level data cache.

* * * * *